United States Patent
Kim et al.

(10) Patent No.: US 9,923,736 B2
(45) Date of Patent: Mar. 20, 2018

(54) METHOD FOR PERFORMING CHANNEL ESTIMATION, AND APPARATUS THEREFOR

(71) Applicant: LG ELECTRONICS INC., Seoul (KR)

(72) Inventors: Hyungtae Kim, Seoul (KR); Jonghyun Park, Seoul (KR); Youngtae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/511,603

(22) PCT Filed: Sep. 25, 2015

(86) PCT No.: PCT/KR2015/010198
§ 371 (c)(1),
(2) Date: Mar. 15, 2017

(87) PCT Pub. No.: WO2016/048089
PCT Pub. Date: Mar. 31, 2016

(65) Prior Publication Data
US 2017/0302480 A1    Oct. 19, 2017

Related U.S. Application Data

(60) Provisional application No. 62/055,630, filed on Sep. 25, 2014.

(51) Int. Cl.
*H04B 7/06*    (2006.01)
*H04L 25/02*   (2006.01)
*H04B 7/024*   (2017.01)

(52) U.S. Cl.
CPC ....... *H04L 25/0224* (2013.01); *H04B 7/0626* (2013.01); *H04B 7/0632* (2013.01);
(Continued)

(58) Field of Classification Search
CPC . H04B 7/02; H04B 7/04; H04B 7/024; H04B 7/0456; H04B 7/0626;
(Continued)

(56) References Cited

U.S. PATENT DOCUMENTS

| | | | |
|---|---|---|---|
| 8,989,114 B2* | 3/2015 | Kim | H04B 7/024 370/252 |
| 2011/0200131 A1* | 8/2011 | Gao | H04B 7/0452 375/267 |

(Continued)

OTHER PUBLICATIONS

PCT International Application No. PCT/KR2015/010198, Written Opinion of the International Searching Authority dated Jan. 20, 2016, 4 pages.

(Continued)

*Primary Examiner* — Shawkat M Ali
(74) *Attorney, Agent, or Firm* — Lee Hong Degerman Kang Waimey

(57) ABSTRACT

A method for reporting a channel state for a downlink channel to be transmitted via at least one two-dimensional array antenna element composed of a row antenna array and a column antenna array is disclosed in accordance with one embodiment of the present invention. The method is performed by a terminal, and the method may comprise the steps of: receiving settings for channel state information (CSI) process 1 and CSI process 2, the CSI process 1 and the CSI process 2 each comprising a plurality of CSI-reference signal (RS) settings; selecting one of the CSI process 1 and the CSI process 2 if the CSI process 1 and the CSI process 2 have the same feedback cycle and offset; and estimating the downlink channel and reporting the channel estimation to a serving base station according to one selected from the CSI process 1 and the CSI process 2.

12 Claims, 10 Drawing Sheets

(52) U.S. Cl.
CPC ........... *H04B 7/0634* (2013.01); *H04B 7/024* (2013.01); *H04B 7/0617* (2013.01)

(58) Field of Classification Search
CPC ....... H04B 7/0632; H04B 7/0634; H04L 1/00; H04L 5/00; H04L 5/0048; H04L 5/0073; H04L 25/0224; H04W 4/00; H04W 72/04; H04W 72/042; H04W 72/08
USPC .................. 370/329, 336; 375/260, 267, 349
See application file for complete search history.

(56) References Cited

U.S. PATENT DOCUMENTS

| | | | |
|---|---|---|---|
| 2012/0213111 A1* | 8/2012 | Shimezawa | H04B 7/063 370/252 |
| 2013/0070723 A1* | 3/2013 | Yie | H04B 7/0641 370/329 |
| 2014/0003240 A1 | 1/2014 | Chen et al. | |
| 2014/0098689 A1* | 4/2014 | Lee | H04B 7/0469 370/252 |
| 2014/0112406 A1* | 4/2014 | Zhu | H04B 7/0452 375/267 |
| 2014/0192762 A1* | 7/2014 | Li | H04L 25/03929 370/329 |
| 2014/0198751 A1* | 7/2014 | Prasad | H04B 7/0452 370/329 |
| 2015/0030006 A1* | 1/2015 | Fujio | H04B 7/0456 370/336 |
| 2015/0295694 A1* | 10/2015 | Li | H04L 1/0026 370/329 |

OTHER PUBLICATIONS

Alcatel-Lucent, "Considerations on CSI feedback enhancements for high-priority antenna configurations", 3GPP TSG RAN WG1 Meeting #66, R1-112420, Aug. 2011, 7 pages.

Qualcomm Incorporated, "Framework for DL CoMP CSI test", 3GPP TSG RAN WG4 Meeting #66, R4-133071, Feb. 2013, 7 pages.

Qualcomm Incorporated, "Remaining issues on DL CoMP CSI test", 3GPP TSG RAN WG4 Meeting #68, R4-133229, Aug. 2013, 11 pages.

Qualcomm Incorporated, "DL CoMP demodulation test", 3GPP TSG RAN WG4 Meeting #66bis, R4-131300, Apr. 2013, 6 pages.

* cited by examiner (a)

(b)

Block A

Block B

METHOD FOR PERFORMING CHANNEL ESTIMATION, AND APPARATUS THEREFOR

CROSS-REFERENCE TO RELATED APPLICATIONS

This application is the National Stage filing under 35 U.S.C. 371 of International Application No. PCT/KR2015/010198, filed on Sep. 25, 2015, which claims the benefit of U.S. Provisional Application No. 62/055,630, filed on Sep. 25, 2014, the contents of which are all hereby incorporated by reference herein in their entirety.

TECHNICAL FIELD

The present invention relates to a wireless communication system, and more particularly, to a method for reporting a channel state through channel estimation using antenna ports entirely or in part and apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

The present invention proposes a scheme for a channel state reporting. Through this, the present invention proposes a signaling scheme related to a more efficient channel state reporting.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of reporting a channel state of a downlink channel transmitted through a 2-dimension (2D) array antenna element including one or more horizontal antenna arrays and one or more vertical antenna arrays, the method performed by a terminal, the method including receiving configurations for channel state information (CSI) process 1 and CSI process 2, each including a plurality of CSI-reference signal (RS) configurations, when CSI feedback period and offset of the CSI process 1 are equal to those of the CSI process 2, selecting one of the CSI process 1 and the CSI process 2, and measuring and reporting the downlink channel to a serving base station according to the selected one of the CSI process 1 and the CSI process 2.

Additionally or alternatively, the method may further include transmitting information on the selected one of the CSI process 1 and the CSI process 2 to the serving base station.

Additionally or alternatively, the process 1 may include information on CSI-RS for one row antenna array of the 2D array antenna element and CSI-RS for one column antenna array of the 2D array antenna element.

Additionally or alternatively, the CSI process 2 may include information on CSI-RS for all row antenna arrays of the 2D array antenna element.

Additionally or alternatively, the method may further include, when the CSI process 1 is selected, restoring a full channel for the 2D array antenna element using Kronecker Product of a channel measured from CSI-RS1 for one row antenna array of the 2D array antenna element and CSI-RS2 for one column antenna array of the 2D array antenna element and calculating and reporting a rank indicator, a precoding matrix indicator and a channel quality indicator for the restored full channel.

Additionally or alternatively, the method may further include, when the CSI process 1 is selected, calculating and reporting a rank indicator, a precoding matrix indicator and a channel quality indicator for one of channels measured from CSI-RS1 for one row antenna array of the 2D array antenna element and CSI-RS2 for one column antenna array of the 2D array antenna element, and the report may include information on the selected CSI-RS configuration.

Additionally or alternatively, the method may further include, when the CSI process 1 is selected, restoring a full channel for the 2D array antenna element using Kronecker Product of a channel measured from CSI-RS1 for one row antenna array of the 2D array antenna element and CSI-RS2 for one column antenna array of the 2D array antenna element and calculating and reporting a rank indicator 1 and a precoding matrix indicator 1 for a first channel measured from the CSI-RS1, a rank indicator 2 and a precoding matrix indicator 2 for a second channel measured from the CSI-RS2, and a channel quality indicator for the full channel based on the rank indicator 1, the rank indicator 2, the precoding matrix indicator 1 and the precoding matrix indicator 2.

Additionally or alternatively, the method may further include, when the CSI process 2 is selected, restoring a full channel for the 2D array antenna element using a channel measured from CSI-RSs for all row antenna arrays of the 2D array antenna element and calculating and reporting a rank indicator, a precoding matrix indicator and a channel quality indicator for the restored full channel.

Additionally or alternatively, the method may further include, when the CSI process 2 is selected, calculating and reporting a rank indicator, a precoding matrix indicator and a channel quality indicator for one of channels measured from CSI-RSs for all row antenna arrays of the 2D array antenna element to the base station, and the report may include information on the selected CSI-RS configuration.

Additionally or alternatively, the method may further include, when the CSI process 2 is selected, restoring a full channel for the 2D array antenna element using channels measured from CSI-RSs for all row antenna arrays of the 2D array antenna element and calculating and reporting a rank indicator and a precoding matrix indicator for each of the measured channels and a channel quality indicator for the full channel based on the rank indicator and the precoding matrix indicator for each of the channels.

Additionally or alternatively, the method may further include transmitting, to the serving base station, a phase rotation value between the precoding matrix indicators for each of the channels.

In another technical aspect of the present invention, provided herein is a terminal configured to report a channel state of a downlink channel transmitted through a 2-dimension (2D) array antenna element including one or more row antenna arrays and one or more column antenna arrays, the terminal including a radio frequency (RF) unit and a processor configured to control the RF unit, wherein the processor is further configured to receive configurations for channel state information (CSI) process 1 and CSI process 2, wherein each of the CSI process 1 and the CSI process 2 includes a plurality of CSI-reference signal (RS) configurations, wherein select one of the CSI process 1 and the CSI process 2 when CSI feedback period and offset of the CSI process 1 are equal to those of the CSI process 2, and measure and report the downlink channel to a serving base station according to the selected one of the CSI process 1 and the CSI process 2.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to one embodiment of the present invention, a channel state reporting through channel estimation using antenna ports entirely or partially is enabled, efficiency in antenna port configuration for the channel state reporting is enhanced, and an efficient channel state reporting is possible.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
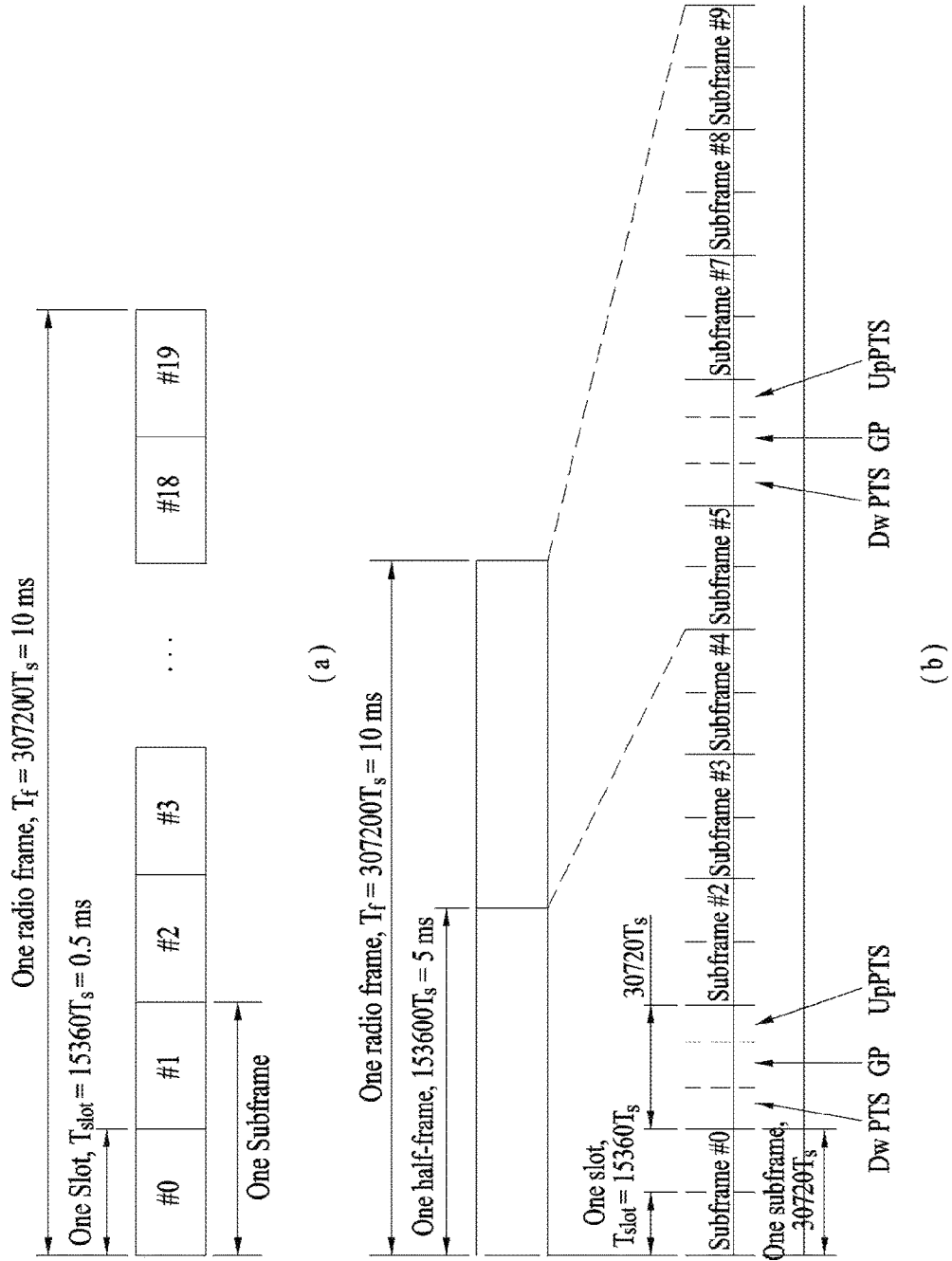
FIG. 1 shows one example of a radio frame structure used by a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/ PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/ PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/ LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | $6592 \cdot T_s$ | | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | | $20480 \cdot T_s$ | | |
| 2 | $21952 \cdot T_s$ | | | | $23040 \cdot T_s$ | | |
| 3 | $24144 \cdot T_s$ | | | | $25600 \cdot T_s$ | | |
| 4 | $26336 \cdot T_s$ | | | | $7680 \cdot T_s$ | $4384 \cdot T_s$ | $5120 \cdot T_s$ |
| 5 | $6592 \cdot T_s$ | | $4384 \cdot T_s$ | $5120 \cdot T_s$ | $20480 \cdot T_s$ | | |
| 6 | $19760 \cdot T_s$ | | | | $23040 \cdot T_s$ | | |

TABLE 2-continued

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | 21952 · $T_s$ |  |  | 12800 · $T_s$ |  |  |
| 8 | 24144 · $T_s$ |  |  | — |  |  |
| 9 | 13168 · $T_s$ |  |  | — |  |  |

Figure 2:
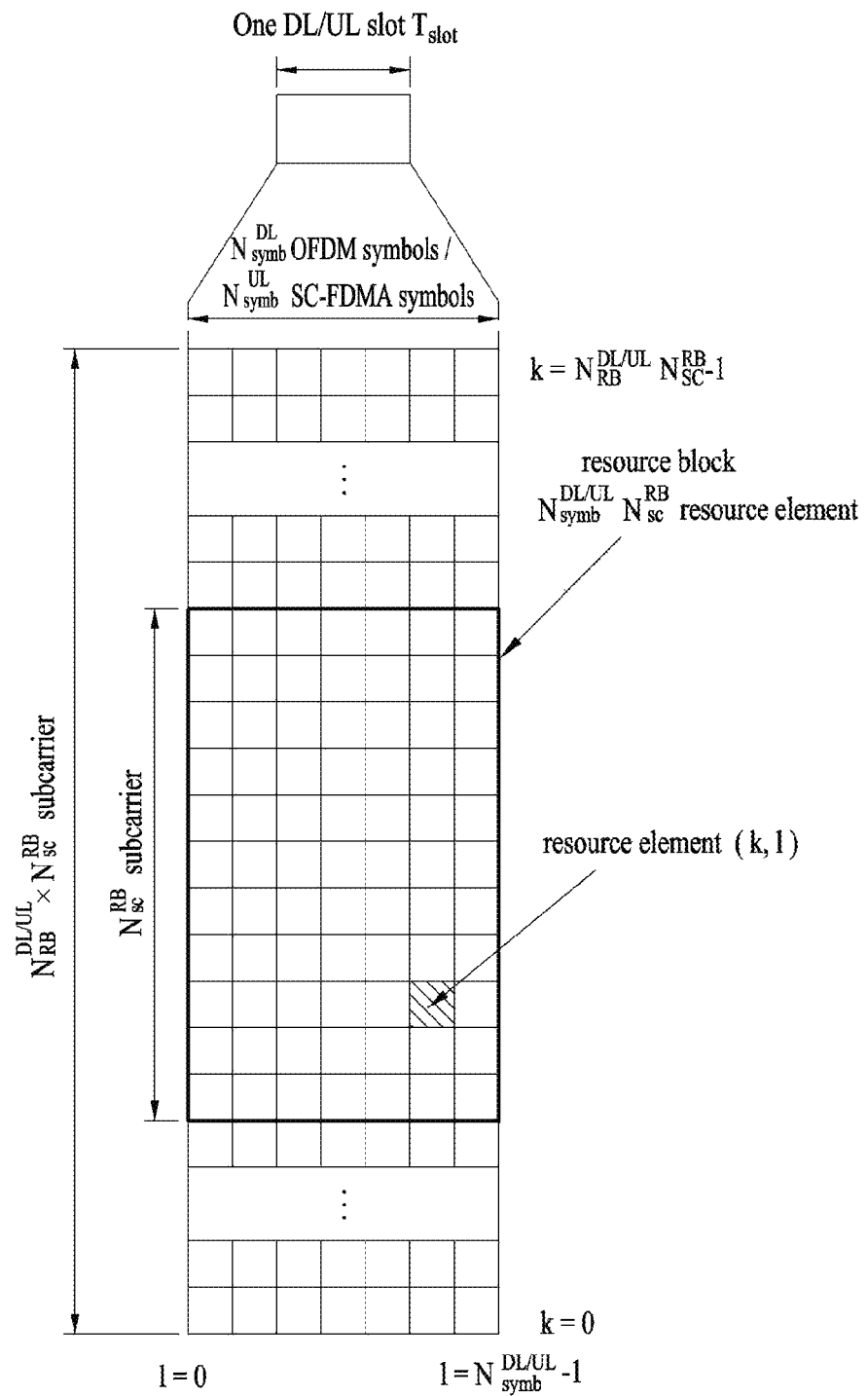
FIG. 2 shows one example of an uplink/downlink (UL/DL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, 1) in a slot. Here, k is an index in the range of 0 to $N_{symb}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
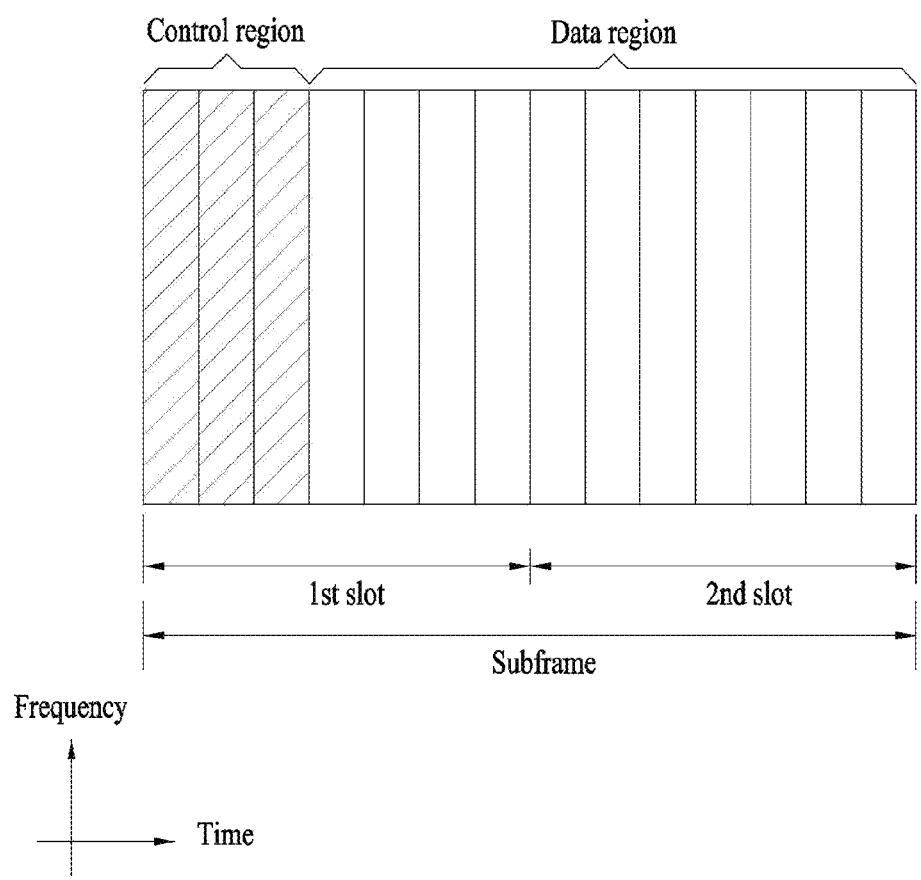
FIG. 3 shows one example of a downlink (DL) subframe structure used by 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PC-FICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
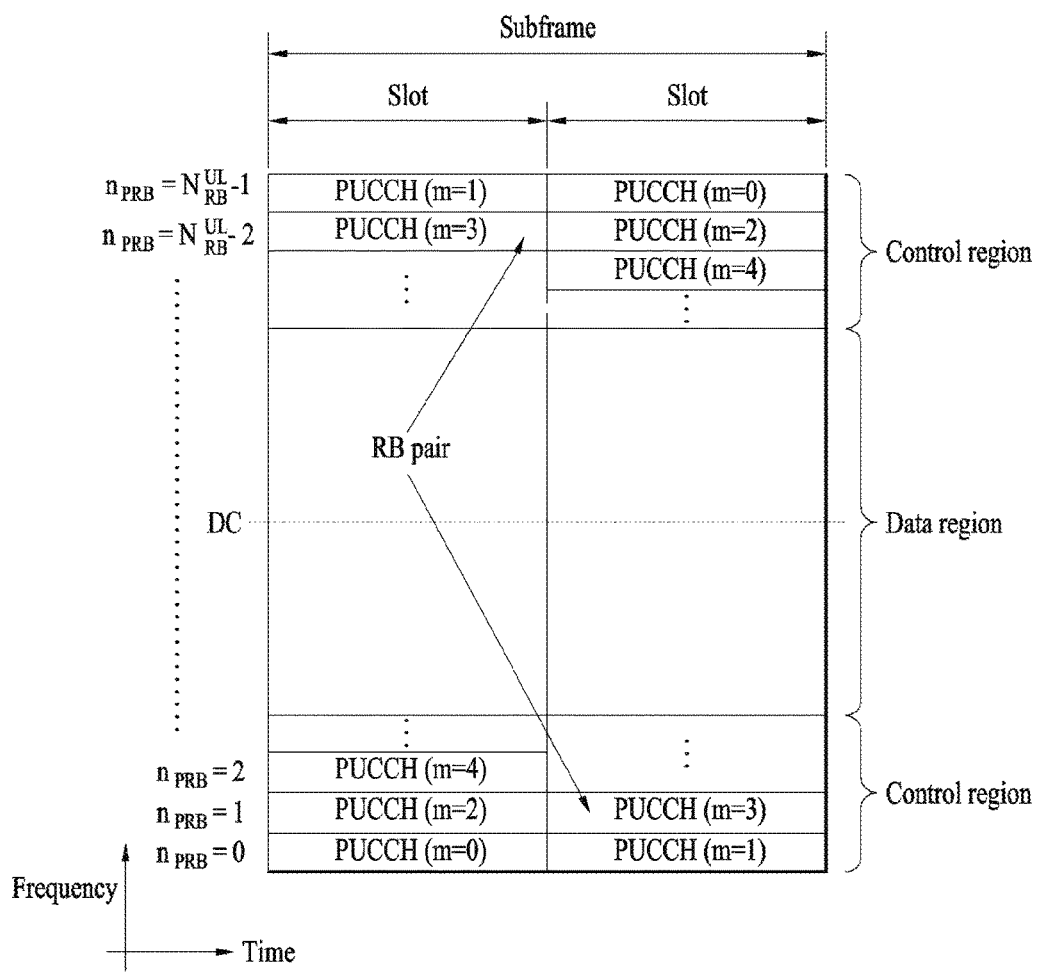
FIG. 4 shows one example of an uplink (UL) subframe structure used by 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
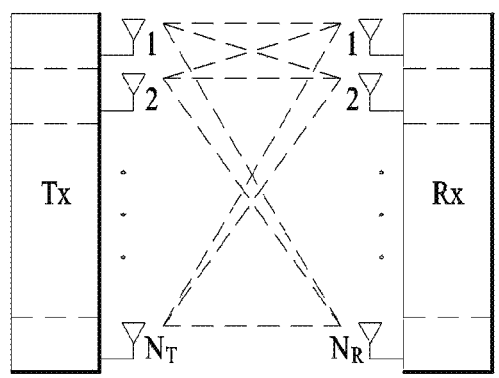
FIG. 5 is a block diagram of MIMO (multi-input multi-output) used by 3GPP LTE/LTE-A system.
Figure 5:
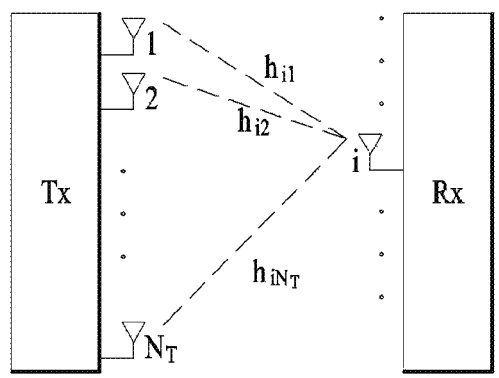

FIG. 5 shows the configuration of a wireless communication system including multiple antennas.

As shown in FIG. 5(a), when both the number of transmit (Tx) antennas and the number of Rx antennas are increased respectively to $N_T$ and $N_R$, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$) The rate of increase ($R_i$) can be represented by the following equation 1.

$$R_i = \min(N_T, N_R)$$ [Equation 1]

For example, provided that a MIMO system uses four Tx antennas and four Rx antennas, the MIMO system can theoretically acquire a high transfer rate which is four times higher than that of a single antenna system.

Mathematical modeling of a communication method for use in the above-mentioned MIMO system will hereinafter be described in detail. It is assumed that there are $N_T$ Tx antennas and $N_R$ Rx antennas.

In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T$$ [Equation 2]

Individual transmission information pieces $s_1, s_2, \ldots, s_{N_T}$ may have different transmission powers. In this case, if the individual transmission powers are denoted by $P_1, P_2, \ldots, P_{N_T}$ transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Also, $\hat{S}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

In the meantime, the information vector $\hat{S}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

Here, $w_{ij}$ denotes a weight corresponding to i-th Tx antenna and j-th information. W represents a weight matrix or precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T$$ [Equation 6]

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}]$$ [Equation 7]

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix}$$ [Equation 8]

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T$$ [Equation 9]

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R * N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R)$$ [Equation 11]

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Codebook-Based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
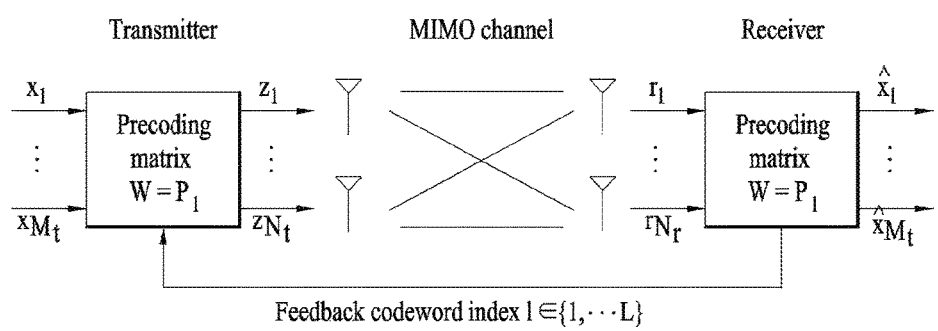
FIG. 6 describes a codebook based beamforming.

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of Rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | |

TABLE 6

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1324\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left( \pm 1, \pm j, \pm \frac{(1+j)}{\sqrt{2}}, \pm \frac{(-1+j)}{\sqrt{2}} \right)$$

used for 8-PSK. In the example codebook of Table 6, since the alphabet of the respective elements of all precoding matrices in the codebook is configured by $$\left\{ \pm 1, \pm j, \pm \frac{(1+j)}{\sqrt{2}}, \pm \frac{(-1+j)}{\sqrt{2}} \right\},$$

the codebook may be considered as having the constrained alphabet property.

Configuration of Multiple Antennas

Figure 7:
FIG. 7 shows an example of a configuration of 8Tx transmitting antenna.
Figure 7:
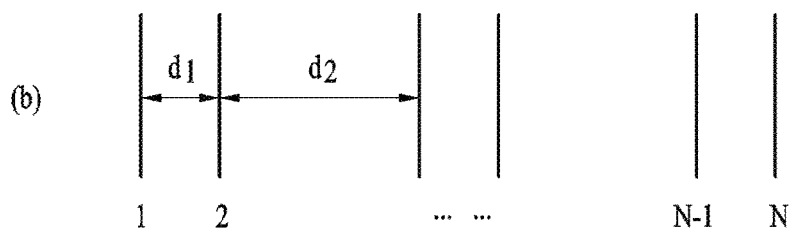
Figure 7:
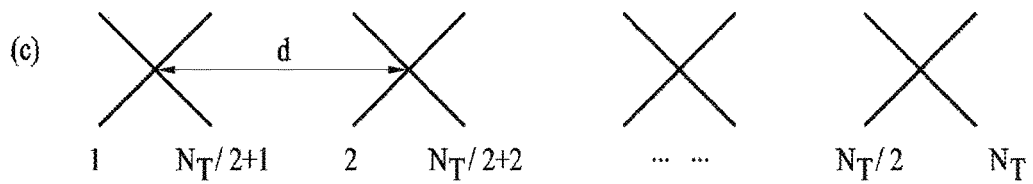

FIG. 7 illustrates configuration of 8 transmit (Tx) antennas.

FIG. 7(a) illustrates a case where N antennas constitute independent channels without being grouped. This antenna array is typically called a uniform linear array (ULA). When the number of antennas is small, the ULA configuration may be used. However, if the number of antennas is large, space for the transmitter and/or receiver may not be sufficient to spatially separate and dispose the multiple antennas to configure independent channels.

FIG. 7(a) illustrates a paired ULA configured by pairing every two antennas. In this case, an associated channel may be shared by a pair of two channels and be independent from the channels of other pairs of channels.

In contrast with legacy 3GPP LTE Release-8/9, which employs 4 Tx antennas for downlink, 3GPP LTE Release-10 or later systems may employ 8 Tx antennas for downlink. To use such extended antenna configuration, multiple Tx antennas need to be installed in an insufficient space, and accordingly the ULA antenna configuration as shown in FIGS. 7(a) and 7(b) may not be appropriate. Accordingly, a dual-pole (or cross-pole or cross polarization) antenna configuration as shown in FIG. 7(c) may be applied. If Tx antennas are configured in this way, independent channels may be configured by lowering correlation of antennas even if the distance d between the antennas is relatively short, and therefore data transmission with high throughput may be possible.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W = W_1 * W_2$ or $W = W_2 * W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 7

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 8

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI(4bit)<br>2nd wideband CQI(4bit)<br>if RI > 1<br>N*Subband PMI(4bit)<br>(N is the total # of subbands)<br>(if 8Tx Ant, N*subband W2 + wideband W1) |
| | UE selected (Subband CQI) | Mode 2-0<br>RI (only for Open-loop SM)<br>1st wideband CQI(4bit) + Best-M CQI(2bit)<br>(Best-M CQI: An average CQI for M SBs selected from among N SBs)<br>Best-M index (L bit) | | Mode 2-2<br>RI<br>1st wideband CQI(4bit) + Best-M CQI(2bit)<br>2nd wideband CQI(4bit) + Best-M CQI(2bit) if RI > 1<br>Best-M index (L bit)<br>Wideband PMI(4bit) + Best-M PMI(4bit)<br>(if 8Tx Ant, wideband W2 + Best-M W2 + wideband W1) |
| | Higher Layer-configured (Subband CQI) | Mode 3-0<br>RI (only for Open-loop SM)<br>1st wideband CQI(4bit) + N*subbandCQI(2bit) | Mode 3-1<br>RI<br>1st wideband CQI(4bit) + N*subbandCQI(2bit)<br>2nd wideband CQI(4bit) + N*subbandCQI(2bit)<br>if RI > 1<br>Wideband PMI(4bit)<br>(if 8Tx Ant, wideband W2 + wideband W1) | Mode 3-2<br>RI<br>1st wideband CQI(4bit) + N*subbandCQI(2bit)<br>2nd wideband CQI(4bit) + N*subbandCQI(2bit) if RI > 1<br>N*Subband PMI(4bit)<br>(N is the total # of subbands)<br>(if 8Tx Ant, N*subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

Figure 9:
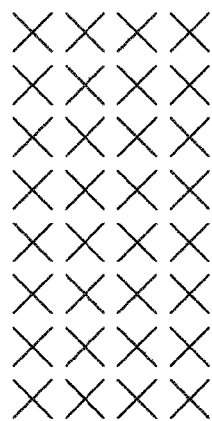
FIG. 9 shows a 2D antenna array configured with cross-polarized (X-pol) antennas.

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

The proposal of the present invention relates to a feedback method for reducing CSI feedback overhead of a UE. In a massive MIMO environment including an eNB having a large number of transmitting antennas, the eNB informs a single UE of a partial or full channel of the transmitting antennas through several CSI-RS configurations. In doing so, although it is preferable that the UE performs feedback ideally in a manner of quantizing information of the full channel with an eNB corresponding to a configured RS into CSI, if a real feedback overhead is taken into consideration, such an operation maybe impossible. As one solution for this, an eNB equally sets CSI feedback period and offset of multiple CSI processes set for a single UE, thereby enabling the CSI processes to collide with each other intentionally. In this case, the US selects a CSI to feed back by applying a new reference instead of following an existing collision rule and then reports what kind of a CSI is selected to a base station together with the selected CSI.

In the present specification, proposed is a method of defining a priority and drop scheme between channel informations in sending feedback for two or more CSI estimations and a single CSI feedback chain design scheme according to the priority and drop scheme and then sending the determined schemes.

Figure 8:
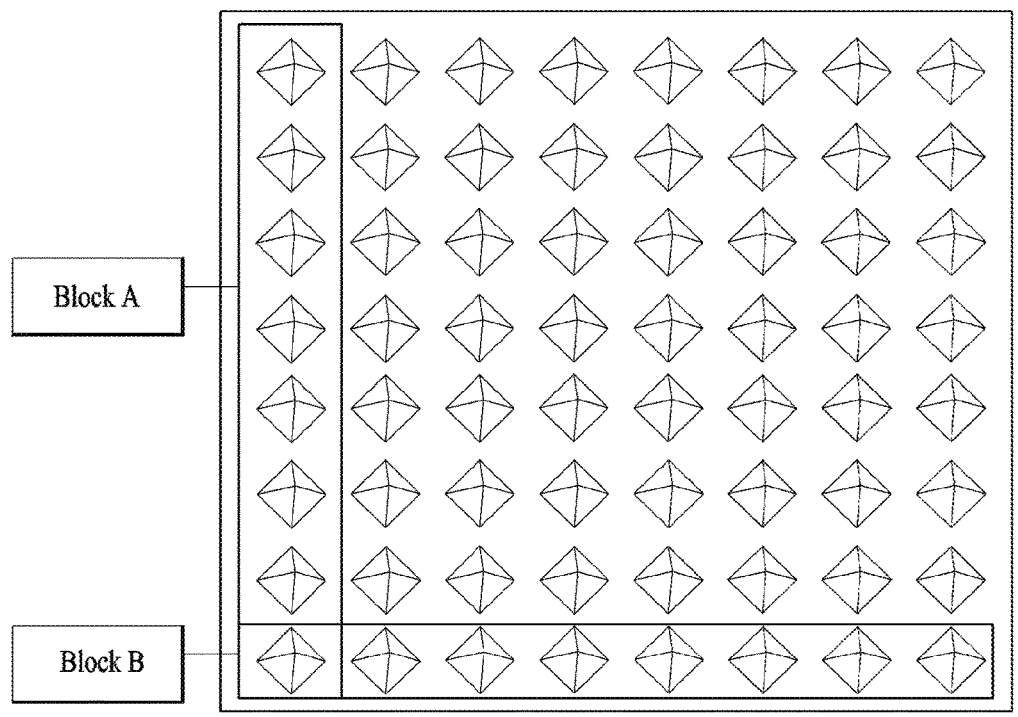
FIG. 8 shows one example of 2D (2-dimensional) antenna array.

After LTE Rel-12, an AAS (active antenna system) utilized antenna system is going to be introduced. Since each antenna of AAS includes an active antenna having an active circuit, the AAS is expected as a technology more efficiently applicable in reducing interference or performing a beamforming by modifying an antenna pattern to meet a situation. If such AAS is established 2-dimensionally [i.e., 2D-AAS], a transmitted beam can be changed more aggressively according to a location of a receiving end by 3-dimensionally adjusting a main lobe of an antenna more efficiently in aspect of an antenna pattern. Such a 2D-AAS is expected to establish a massive antenna system by deploying antennas, as shown in FIG. 8, in vertical and horizontal directions.

In case of introducing such 2D-AAS, in order to inform a receiving end of a channel from a transmitting end to the receiving end, the transmitting end may transmit a specific RS (e.g., CSI-RS (channel state information-reference signal) (hereinafter, named 'CSI-RS' for clarity). In a current LTE system, such CSI-RS is designed into 1-port, 2-port, 4-port, or 8-port CSI-RS. Each n-port CSI-RS should use n REs for 1 RB, where n>1. Hence, in case of 2D-AAS, as there are 8 antennas in a vertical direction and 8 antennas in a horizontal direction, if total 64 antenna ports are provided, 64 REs in 1 RB should be used for CSI-RS according to an existing scheme. Hence, CSI-RS overhead attributed to the number of antennas may cause a problem.

Recently, in order to solve such a problem, proposed is a method of even inferring channels received at the rest of ports using some of SCI-RS ports only. To this end, there are various methods. Yet, according to the present invention, assume a situation of estimating a channel from 2D-AAS to a receiving end by kronecker product as follows.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix} \quad \text{[Formula 12]}$$

In the above formula, ⊗ means a kronecker product operation.

In the above formula, H means a whole channel from a transmitting end to a receiving end, and $H_T^{(j)}$ means a channel from the transmitting end to a $j^{th}$ receiving antenna. $H_V^{(j)}$ and $H_H^{(j)}$ mean channels transmitted from antenna ports (or antenna elements) in vertical and horizontal directions to the $j^{th}$ antenna, respectively. In FIG. 8, $H_V^{(j)}$ means a channel from an antenna of Block A to $j^{th}$ antenna of the receiving end on the assumption that the antenna of the Block A exists only, and $H_H^{(j)}$ means a channel from an antenna of Block B to $j^{th}$ antenna of the receiving end on the assumption that the antenna of the Block B exists only. For clarity, the following description is made in aspect of a random single receiving antenna, and all processes are applicable to other receiving antennas. The following description is made using a channel from the transmitting end to a random single receiving antenna from which an index (j) is eliminated.

$$H_T = H_V \otimes H_H \quad \text{[Formula 13]}$$

Formula 13 is the formula for the description of the present invention, and a real channel may not correspond to Formula 13.

For CSI-RS, a first CSI-RS transmitted from $N_V$ antenna ports in vertical direction like the Block A shown in FIG. 8 and a second CSI-RS transmitted from $N_H$ antenna ports in horizontal direction like the Block B are configured, whereby total 2 CSI-RSs can be configured. Having measured the 2 CSI-RSs, the receiving end may infer a channel using a kronecker product of 2 channel matrixes like Formula 2. Herein, $N_V$ indicates the number of antennas in vertical direction and $N_H$ indicates the number of antennas in horizontal direction. Through this, it is advantageous in informing the receiving end of channels transmitted from 64 ports with the existing 2-, 4- and 8-port CSI-RSs only.

Instead of a same cross-polarized array shown in FIG. 8, it may consider using a cross-polarized antenna array (hereinafter abbreviated X-pol AA) shown in FIG. 9. In this case, a 64-port antenna array may be configured with 8 rows and 2 columns and 2 cross polarization characteristics.

Figure 10:
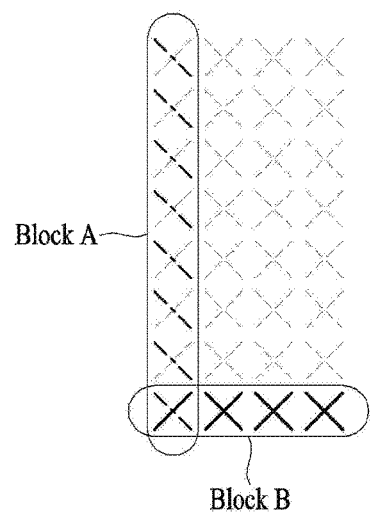
FIG. 10 shows a block selection in a 2D antenna array configured with cross-polarized (X-pol) antennas.

FIG. 10 shows an example of Block A/B in X-pol AA.

In summary, in N-Tx massive MIMO environment including an eNB having a large number of transmitting antennas, N-Tx CSI-RS and N-Tx PMI should be newly defined for CSI feedback. Yet, considering RS overhead or feedback overhead, it may be difficult to newly define N-Tx CSI-RS and PMI. As the alternative to this, a scheme for supporting massive MIMO feedbacks by utilizing the existing M-Tx (M=8 or smaller) antenna CSI-RS and the existing M-Tx PMI is currently discussed. According to the current LTE specifications, it may operate according to a feedback mechanism as follows.

Multiple CSI Processes for Massive MIMO Feedbacks

According to one scheme, a portion of massive antenna is set as CSI-RS for each of multiple CSI processes and a UE can be set to feed back CSI per CSI process. For instance, CSI process 1 and CSI process 2 are configured for one UE, and CSI-RS 1 corresponding to Block A in FIG. 10 and CSI-RS 2 corresponding to Block B in FIG. 10 may be configured for the CSI process 1 and the CSI process 2, respectively. The UE can report the feedback for the CSI-RS 1 and the CSI-RS 2 to an eNB using a CSI feedback chain configured per two CSI processes.

According to the current LTE specifications, multiple CSI processes set for a UE are independent unless a reference process is additionally set. And, the UE independently generates CSI using RS & IMR (interference measurement resource) configured for each CSI process. If CSI feedbacks of two CSI processes collide with each other, one CSI is reported by priorities according to a determined collision handling rule but the other is dropped.

If a single massive channel like 3D MIMO is set for a UE in a manner of being divided into several CSI processes, the UE can be implicitly informed of CSI processes configuring the massive channel using collision between the CSI processes.

For instance, if each of the CSI process 1 and the CSI process 2 shows a portion of channel of 3D massive MIMO to a UE, an eNB causes a collision by intentionally setting the same feedback period and offset for each of the CSI process 1 and the CSI process 2. For clarity, in the present invention, such a collision is named 'perfect collision'. If the multiple CSI processes perfectly collide with each other, the UE recognizes that each of the multiple CSI processes shows a partial channel for one 3D massive MIMO channel. In case of occurrence of the perfect collision, the UE does not follow an existing collision handling rule, selects a CSI to feed back by applying a new rule, and then reports what kind of CSI is selected to the eNB together with the selected CSI.

An eNB may configure multiple CSI processes by dividing a channel of 3D massive MIMO into several partial channels by various schemes. According to this scheme, in case of occurrence of perfect collision, a behavior of a UE changes. Representatively, an eNB may configure partial channels by one of three schemes in the following. A partial channel configuration scheme and a UE CSI feedback method in case of perfect collision according to such a scheme are described as follows.

Partial Channel Configuration Scheme 1

A UE can be informed of a portion of a channel, as shown in FIG. 10, depending on a channel restoring method by Kronecker Product. Namely, CSI process 1 and CSI process 2 can be defined as an RS configured with a horizontal antenna element in a first row and an RS configured with a vertical antenna element in a first column, respectively.

If the two CSI processes perfectly collide with each other, a UE may feed back CSI using one of the following schemes.

Scheme 1-A)

A UE restores the full massive MIMO channel by applying Kronecker Product to channels measured from CSI-RSs of the two CSI processes. For instance, after an RS for a block A and an RS for a block B have been generated in FIG. 10, if they are set as CSI process 1 and CSI process 2 for the UE, the UE can restore 8×8 full channel through Kronecker Product of Formula 13. Thereafter, the UE can periodically perform CSI feedback by calculating RI, PMI and CQI optimal for the full channel.

For instance, if the full channel is configured with 4(=# of Rx Ant.) by 64 (=# of Tx Ant.), the UE selects an RI value equal to or smaller than 4 that is its maximum rank, selects a codeword of 64 by RI from a codebook, selects the selected codeword as a PMI, and selects a CQI obtainable using the RI and the PMI.

Yet, if a super-sized codebook capable of feeding back a full channel at a time is not designed or feedback overhead is greater than channel capacity, at least PMI is preferably designed in a manner of being divided into partial PMIs and a specific partial PMI is preferably fed back in one subframe. The order and period for periodically feeding back a plurality of (or multiple) partial PMIs may be signaled to a UE by an eNB. Or, a UE selects a partial PMI according to self-determination and then feeds back information indicating what kind of a PMI has been selected to an eNB. Likewise, with respect to RI or CQI, a single value determined for a full channel is not fed back. A value of each of the RI and CQI is divided into several partial values. A single partial value is fed back in one subframe. And, what kind of a partial CSI has been selected can be fed back to the eNB. The eNB is then able to regenerate RI, PMI and CQI for the full channel using the partial CSI.

Scheme 1-B)

A UE estimates channels from CSI-RSs of the two CSI processes and then selects a single channel to feed back. In doing so, a channel having more variations with reference to a recently reported CSI of each CSI process can be advantageously selected. Thereafter, the UE may feed back a CSI process index for reporting CSI and the corresponding CSI to an eNB. The corresponding CSI process index may be reported in the same subframe together with PMI, CQI or RI. If a selection of a CSI process index is made in a long term, the CSI process index may be appropriately reported together with RI.

Scheme 1-C)

A UE estimates a vertical channel and a horizontal channel from CSI-RSs of the two CSI processes, respectively and is then able to restore a full massive MIMO channel. The UE reports values corresponding to the vertical channel and the horizontal channel as RI and PMI, respectively. Regarding the CQI, the UE feeds back a CQI, which can be attained when the full massive MIMO channel is used, based on the RI and PMI reported to an eNB.

The two RIs are reported in the same subframe by being joint-encoded. And, the two PMIs may be reported together in the same subframe. Or, PMI may be alternately transmitted in different subframes. For instance, if a subframe capable of sending PMI in a periodic CSI reporting is configured for a p-subframe period by starting with a subframe n (i.e., subframes n, n+p, n+2p, n+3p . . . ), the UE may feed back PMI for a vertical channel in even-numbered subframes (i.e., subframes n, n+2p, n+4p . . . ) and PMI for a horizontal channel in the rest of odd-numbered subframes.

Partial Channel Configuration Scheme 2

In a transmitting antenna of a 2D array type shown in FIG. 9, an antenna in each row direction may be set as a single CSI process. For instance, by setting an RS configured with a horizontal antenna element in an $i^{th}$ row in FIG. 9 as CSI process i, a UE can be informed of total 8 CSI processes.

Some or all of the multiple CSI processes perfectly collide with each other, a UE may feed back CSI using one of the following schemes for the corresponding CSI process.

Scheme 2-A)

A UE restores full massive MIMO channel using channels measured from CSI-RSs of the multiple CSI processes. Thereafter, the UE can periodically perform CSI feedback by calculating RI, PMI and CQI optimal for the full channel.

For instance, if 8 CSI processes are set for the UE in order to indicate the full channel, the UE can make the full channel in a manner of generating a channel $H_i$ of 4(=# of Rx Ant.) by 8 (=# of ports of each CSI-RS) using CSI-RS i defined in an $i^{th}$ CSI process and then aggregating the generated partial channels $H_i$. Namely, by configuring the full channel [$H_1$ $H_2$ $H_3$ $H_4$ $H_5$ $H_6$ $H_7$ $H_8$] of 4(=# of Rx Ant.) by 64 (=# of Tx Ant.), an optima CSI capable of receiving data through the full channel can be calculated.

For instance, if the full channel is configured with 4(=# of Rx Ant.) by 64 (=# of Tx Ant.), the UE selects an RI value equal to or smaller than 4 that is its maximum rank, selects a codeword of 64 by RI from a codebook, selects the selected codeword as a PMI, and selects a CQI obtainable using the RI and the PMI.

Yet, if a super-sized codebook capable of feeding back a full channel at a time is not designed or feedback overhead is greater than channel capacity, at least PMI is preferably designed in a manner of being divided into partial PMIs and a specific partial PMI is preferably fed back in one subframe. The order and period for periodically feeding back a plurality of (or multiple) partial PMIs may be signaled to a UE by an eNB. Or, a UE selects a partial PMI according to self-determination and then feeds back information indicating what kind of a PMI has been selected to an eNB. Likewise, with respect to RI or CQI, a single value determined for a full channel is not fed back. A value of each of the RI and CQI is divided into several partial values. A single partial value is fed back in one subframe. And, what kind of a partial CSI has been selected can be fed back to the eNB. The eNB is then able to regenerate RI, PMI and CQI for the full channel using the partial CSI.

Scheme 2-B)

A UE estimates channels from CSI-RSs of the multiple CSI processes and then selects a single channel to feed back. In doing so, a CSI process having a largest channel size can be advantageously selected. Thereafter, the UE may reports a CSO process index for reporting CSI and the corresponding CSI to an eNB. The corresponding CSI process index may be reported in the same subframe together with PMI, CQI or RI. If a selection of a CSI process index is made in a long term, the CSI process index may be appropriately reported together with RI. In this case, the UE may obtain a diversity gain by selecting one horizontal Tx antenna set having a best channel from several horizontal Tx antenna sets.

Figure 11:
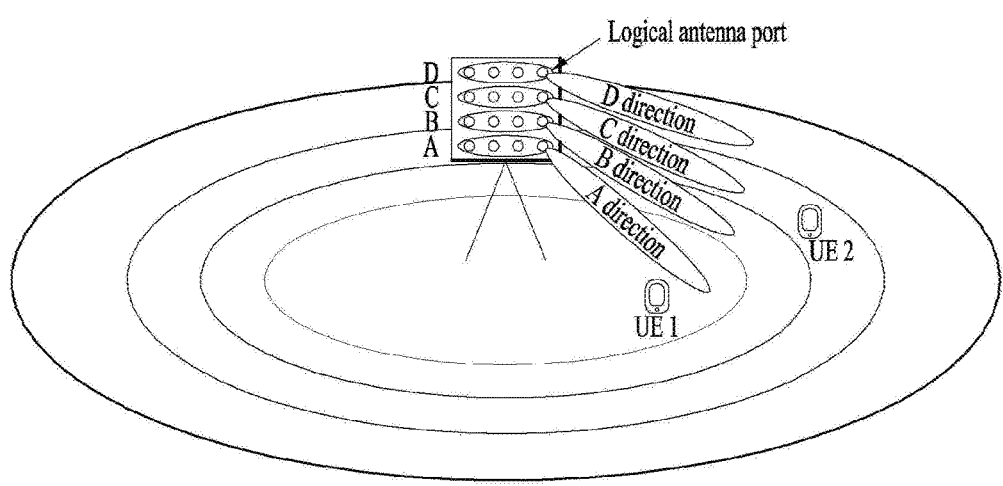
FIG. 11 shows an antenna port grouping and a corresponding sector according to one embodiment of the present invention.

According to a modification of the partial channel configuration scheme 2, if CSI-RS is configured like FIG. 11, the CSI feedback of the scheme 2-B may be utilized as an effective feedback scheme for elevation beamforming. For instance, as shown in FIG. 11, one cell can be divided into 4 sectors in donut shape through 4 vertical beams A, B, C and D. And, the vertical beams A, B, C and D are transmitted by being applied to four 4-port horizontal RSs (H-CSI-RSs), respectively. Although FIG. 10 shows an antenna element, each point represented at an eNB in FIG. 11 means a logical antenna port, i.e., a single RS port. The four 4-port H-CSI-RSs are named H-CSI-RS A, H-CSI-RS B, H-CSI-RS C and H-CSI-RS D, respectively. Since UE 1 is located in a sector A, it measures a strongest channel from the H-CSI-RS A having the vertical beam A applied thereto. And, UE 2 may measure a strongest channel from the H-CSI-RS C. in such an environment, an eNB may configure 4 CSI processes corresponding to the four H-CSI-RSs and set them to collide with each other. Each UE selects a CSI process having a largest channel size and then feeds back a CSI of the corresponding CSI process together with a corresponding index.

Scheme 2-C)

A UE estimates channels from CSI-RSs of the multiple CSI processes, respectively and is then able to restore a full massive MIMO channel through the measured channels. The UE reports RI and PMI of values corresponding to each channel and is able to feed back a CQI, which can be attained when the full massive MIMO channel is used, based on the RI and PMI reported to an eNB.

The two RIs are reported in the same subframe by being joint-encoded. And, the two PMIs may be reported together in the same subframe. Or, PMI may be alternately transmitted in different subframes. For instance, if a subframe capable of sending PMI in a periodic CSI reporting is configured for a p-subframe period by starting with a subframe n (i.e., transmitting PMI in subframes n, n+p, n+2p, n+3p . . . ), the UE may feed back PMIs by starting with PMI of a first CSI process in sequence using the configured subframe.

Moreover, according to this scheme, the UE may additionally report an inter-PMI co-phase rotation value as well as PMI. The co-phase rotation value was discussed for CoMP coherent joint transmission. When a super PMI corresponding to a full channel is generated by combining multiple PMIs, the co-phase rotation value performs phase compensation on PMI i and PMI j, thereby helping two beams corresponding to i and j to become a constructive sum.

An eNB configures a partial channel in various forms and informs a UE of each partial channel through RS. Since a CSI calculating method of a UE is changed according to a partial channel configuration scheme (e.g., whether to calculate CSI by applying Kronecker Product, whether to calculate CSI after configuring full massive MIMO channel by another scheme, etc.), the eNB agrees in advance on which partial channel will be notified to the UE through RS, which requires a corresponding signaling. For instance, the UE and the eNB agreed in advance on the partial channel configuration schemes 1 and 2, and the eNB signals to the UE that which one of the two partial channel configuration schemes will be notified through RS. In order to semi-statically change the configuration for the partial channel, the eNB and the UE may share the corresponding information through RRC (radio resource control) signaling.

As described above, the eNB configures a partial channel in various forms and informs the UE of the partial channel through RS. Since RS overhead and CSI feedback overhead vary according to a partial channel configuration scheme, it is preferable that the partial channel configuration scheme is determined in consideration of tradeoff for overhead and performance. For instance, since the partial channel configuration scheme 1 does not configure an RS for a prescribed antenna, it has RS overhead smaller than that of the partial channel configuration scheme 2. Yet, if the partial channel configuration scheme 1 is used, UE throughput may be low.

As described above, an eNB may determine a partial channel configuration scheme and then notify it to a UE. Alternatively, the UE may select a partial channel configuration scheme and then notify it to the eNB. For instance, after the partial channel configuration schemes 1 and 2 have been configured for the UE, the UE may select and notify a partial channel, which can maximize tradeoff between overhead and performance in a UE's channel environment, to the eNB. To this end, a definition of an existing CSI process should be modified as follows. Although an existing CSI process includes a single CSI-RS, a new CSI process may include a multitude of CSI-RSs. Herein, each of a multitude of the CSI-RSs represents a partial channel that constructs a full massive channel. For instance, CSI process 1 for the partial channel configuration scheme 1 is configured, and two RSs for the blocks A and B shown in FIG. 10 can be defined in the CSI process 1. Moreover, CSI process 2 is configured for the partial channel configuration scheme 2, and a multitude of RSs corresponding to each row antenna can be defined in the CSI process 2. And, an indicator indicating how a partial channel is configured in each CSI process is necessary. The eNB makes the two CSI processes collide perfectly with each other in order to enable the UE to select one scheme appropriate for a channel environment of its own. The UE may select a partial channel configuration scheme in a manner of selecting one CSI process appropriate for its channel environment without following an existing collision handling rule. The UE feed backs the selected CSI process index together with CSI, thereby informing the eNB of the selected partial channel configuration scheme. For instance, if the UE is on LOS (line of sight) dominant channel, the partial channel configuration scheme 1 dependent on Kronecker Product can feedback a full channel with high accuracy. Hence, in this case, the UE can feed back the CSI process 1 selected from the two CSI processes having collided perfectly with each other. Otherwise, the UE feed backs the CSI process 2, thereby preventing degradation of performance.

Aperiodic Feedback

The aforementioned partial channel configuration schemes may be applicable to periodic CSI feedback. If they are extended, although an eNB triggers aperiodic CSI feedback to a UE, a UE feedback operation for multiple CSI processes, to which perfect collision is applied, may vary.

For example, assume that an eNB triggers aperiodic CSI feedback through DCI format 0 or 4 and designates a state '00' to a CSI request field in DCI. In a state '10', CSI processes 1 to 3 are configured as a set. And, it is a perfect collision state because the CSI processes 1 to 3 have the same periodic feedback period and offset. A UE may recognize RSs of the three CSI processes as a partial channel of a massive MIMO channel and generate and report CSI by one of the aforementioned various partial channel configuration schemes. Preferably, considering that feedback capacity of aperiodic feedback using PUSCH is larger than periodic feedback capacity, a full channel is configured according to the partial channel configuration scheme 1 and CSI (e.g., RI, PMI, CQI) corresponding to the full channel can be then fed back at a time.

Although the UE assumes that all CSI processes configured in one set are in the perfect collision state in the above example, the present proposal may be applicable to a case that some of CSI processes are in a perfect collision state. For instance, if only CSI processes 1 and 2 are in a perfect collision state, the UE may recognize that RS of the two CSI processes is a partial channel of one massive MIMO channel and generate and report CSI by one of the aforementioned various partial channel configuration schemes. CSI process 3 is recognized as an independent CSI process, calculates an independent CSI in a manner identical to an existing manner. And, the UE feeds back the calculated CSI together with the above-calculated CSI for massive MIMO.

According to another scheme, a UE is informed that multiple CSI processes triggered by adding a new field to DCI are partial channels of massive MIMO, and the UE can perform CSI feedback by the aforementioned various partial channel configuration schemes of configuring the partial channels. For instance, an existing 2-bit CSI request field is extended to 3 bits, and it is able to agree on that a set of CSI processes mapped to the added state (i.e., 100, 101, 110 and 111) is a set of partial channels configuring a full channel.

According to further scheme, a UE can be informed through RRC signaling that multiple CSI processes are partial channels of massive MIMO. For instance, when CSI process configuration is RRC-signaled, it is able to additionally indicate 'a connected CSI process index' together. For instance, if RSs of CSI processes 1 and 2 indicate different partial channels for a full channel, respectively, the CSI processes 1 and 2 are configured for the UE and 'linked CSI process index=2' is included in RRC configuration of the CSI process 1. Hence, the UE can be aware that a channel estimated from the two CSI processes configures a full channel through an appropriate interpolation operation. What kind of an interpolation operation will be taken is determined depending on a partial channel configuration scheme on which the eNB and the UE agreed through signaling. For instance, interpolation can be performed by Kronecker Product like Formula 13.

In the above-proposed substance, in case that a UE is operated to select a partial channel, an operation of aperiodic CSI feedback needs to be modified to fit such operation. For instance, if CSI processes having collided perfectly with each other exist in the triggered CSI process set, the CSI processes are in relation of contention. And, the UE may feed back one of the CSI processes together with a CSI process index. In doing so, a plurality of CSI-RSs are configured in each CSI process. And, each CSI process may represent a full channel according to a different partial channel configuration scheme. As described above, the UE selects a channel configuration scheme appropriate for its own channel, thereby selecting a CSI process index.

Figure 12:
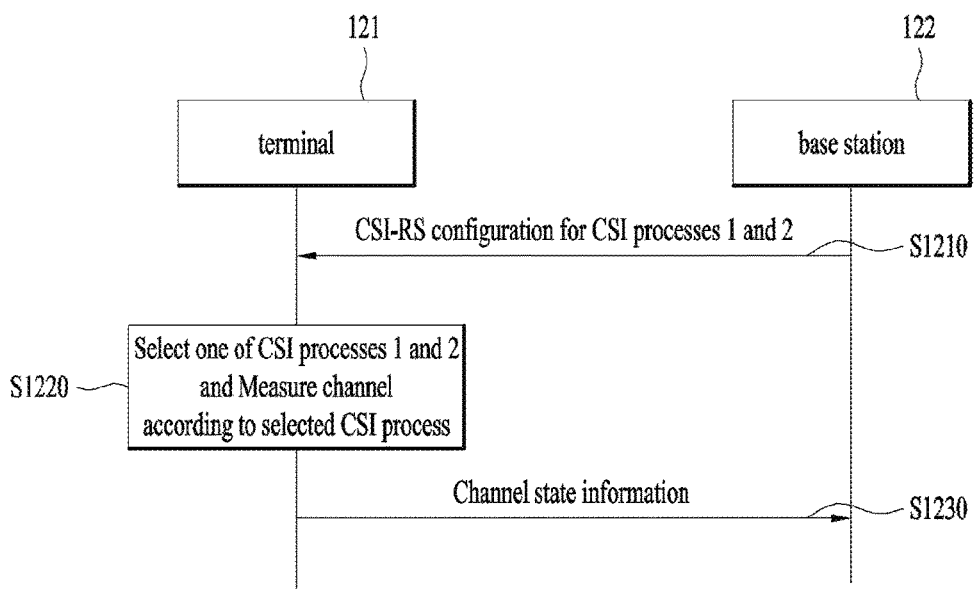
FIG. 12 shows an operation according to one embodiment of the present invention.

FIG. 12 shows an operation according to one embodiment of the present invention.

FIG. 12 relates to a method of reporting a channel state for a downlink channel transmitted through a 2D array antenna element configured with at least one row antenna array and at least one column antenna element.

A user equipment 121 may receive configuration for Channel State Information (CSI) process 1 and CSI process 2 from a base station 122. Each of the CSI process 1 and the CSI process 2 may include a plurality of CSI-RS (reference signal) configurations.

If CSI feedback period and offset of the CSI process 1 is equal to those of the CSI process 2, the user equipment may select one of the CSI processes 1 and 2 for the channel state reporting [S1220]. Moreover, according to the one selected from the CSI processes 1 and 2, the user equipment may measure a downlink channel [S1220]. Thereafter, the user equipment may send channel state information on the measured downlink channel to the base station [S1230]. Moreover, the user equipment may send information on the one selected from the CSI processes 1 and 2 to the base station.

The CSI process 1 may include information on CSI-RS for one row antenna array of the 2D array antenna element and CSI-RS for one column antenna array of the 2D array antenna element. The CSI process 2 may include information on CSI-RS for all row antenna arrays of the 2D array antenna element.

If the CSI process 1 is selected, the user equipment may restore a full channel for the 2D array antenna element by applying Kronecker Product to a channel measured from CSI-RS1 for the one row antenna array of the 2D array antenna element and CSI-RS2 for the one column antenna array of the 2D array antenna element and calculate and report a rank indicator, a precoding matrix indicator and a channel quality indicator for the restored full channel to the base station.

If the CSI process 1 is selected, the user equipment may calculate and report a rank indicator, a precoding matrix indicator and a channel quality indicator for a channel measured from CSI-RS1 for the one row antenna array of the 2D array antenna element and CSI-RS2 for the one column antenna array of the 2D array antenna element to the base station. Herein, the report may include information on the selected CSI-RS configuration.

If the CSI process 1 is selected, the user equipment may restore a full channel for the 2D array antenna element by applying Kronecker Product to a channel measured from CSI-RS1 for the one row antenna array of the 2D array antenna element and CSI-RS2 for the one column antenna array of the 2D array antenna element. And, the user equipment may calculate and report a rank indicator1 and a precoding matrix indicator1 for a first channel measured from the CSI-RS1, a rank indicator2 and a precoding matrix indicator2 for a second channel measured from the CSI-RS2, and a channel quality indicator for the full channel based on the rank indicator1, the rank indicator2, the precoding matrix indicator1 and the precoding matrix indicator2 to the base station.

If the CSI process 2 is selected, the user equipment may restore a full channel for the 2D array antenna element using a channel measured from CSI-RSs for all row antenna arrays of the 2D array antenna element and then calculate and report a rank indicator, a precoding matrix indicator and a channel quality indicator for the restored full channel to the base station.

If the CSI process 2 is selected, the user equipment may calculate and report a rank indicator, a precoding matrix indicator and a channel quality indicator for one of channels measured from CSI-RSs for all row antenna arrays of the 2D array antenna element to the base station. Herein, the report may include information on the selected CSI-RS configuration.

If the CSI process 2 is selected, the user equipment may restore a full channel for the 2D array antenna element using channels measured from CSI-RSs for all row antenna arrays of the 2D array antenna element. And, the user equipment may calculate and report a rank indicator and a precoding matrix indicator for each of the measured channels and a channel quality indicator for the full channel based on the rank indicator and the precoding matrix indicator for each of the channels to the base station.

And, the user equipment may transmit a phase rotation value between the precoding matrix indicators for each of the channels to the base station.

Figure 13:
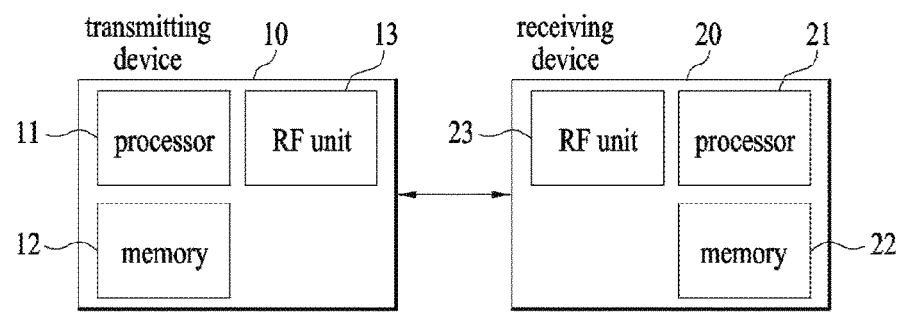
FIG. 13 is a block diagram of a device for implementing embodiment(s) of the present invention.

FIG. 13 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

What is claimed is:

1. A method of reporting a channel state of a downlink channel transmitted through a 2-dimension (2D) array antenna element including one or more row antenna arrays and one or more column antenna arrays, the method performed by a terminal, the method comprising:
receiving configurations for a channel state information (CSI) process 1 and a CSI process 2, each of the CSI process 1 and the CSI process 2 including a plurality of CSI-reference signal (RS) configurations;
when a CSI feedback period and a CSI feedback offset of the CSI process 1 are equal to those of the CSI process 2, selecting one of the CSI process 1 and the CSI process 2; and
measuring and reporting the downlink channel to a serving base station according to the selected one of the CSI process 1 and the CSI process 2.

2. The method of claim 1, further comprising transmitting information on the selected one of the CSI process 1 and the CSI process 2 to the serving base station.

3. The method of claim 1, wherein the process 1 includes information on a CSI-RS for one row antenna array of the 2D array antenna element and a CSI-RS for one column antenna array of the 2D array antenna element.

4. The method of claim 1, wherein the CSI process 2 includes information on a CSI-RS for all row antenna arrays of the 2D array antenna element.

5. The method of claim 1, further comprising:
when the CSI process 1 is selected, restoring a full channel for the 2D array antenna element using a Kronecker Product of a channel measured from a CSI-RS 1 for one row antenna array of the 2D array antenna element and a CSI-RS2 for one column antenna array of the 2D array antenna element; and
calculating and reporting a rank indicator, a precoding matrix indicator and a channel quality indicator for the restored full channel.

6. The method of claim 1, further comprising:
when the CSI process 1 is selected, calculating and reporting a rank indicator, a precoding matrix indicator and a channel quality indicator for one of channels measured from a CSI-RS 1 for one row antenna array of the 2D array antenna element and a CSI-RS2 for one column antenna array of the 2D array antenna element,
wherein information on a selected CSI-RS configuration is reported.

7. The method of claim 1, further comprising:
when the CSI process 1 is selected, restoring a full channel for the 2D array antenna element using a Kronecker Product of a channel measured from a CSI-RS 1 for one row antenna array of the 2D array antenna element and a CSI-RS2 for one column antenna array of the 2D array antenna element; and
calculating and reporting a rank indicator 1 and a precoding matrix indicator 1 for a first channel measured from the CSI-RS 1, a rank indicator 2 and a precoding matrix indicator 2 for a second channel measured from the CSI-RS2, and a channel quality indicator for the full channel based on the rank indicator 1, the rank indicator 2, the precoding matrix indicator 1 and the precoding matrix indicator 2.

8. The method of claim 1, further comprising:
when the CSI process 2 is selected, restoring a full channel for the 2D array antenna element using a channel measured from CSI-RSs for all row antenna arrays of the 2D array antenna element; and
calculating and reporting a rank indicator, a precoding matrix indicator and a channel quality indicator for the restored full channel.

9. The method of claim 1, further comprising:
when the CSI process 2 is selected, calculating and reporting a rank indicator, a precoding matrix indicator and a channel quality indicator for one of channels measured from CSI-RSs for all row antenna arrays of the 2D array antenna element to the base station,
wherein information on a selected CSI-RS configuration is reported.

10. The method of claim 1, further comprising:
when the CSI process 2 is selected, restoring a full channel for the 2D array antenna element using channels measured from CSI-RSs for all row antenna arrays of the 2D array antenna element; and
calculating and reporting a rank indicator and a precoding matrix indicator for each of the measured channels and a channel quality indicator for the full channel based on the rank indicator and the precoding matrix indicator for each of the measured channels.

11. The method of claim 10, further comprising:
transmitting, to the serving base station, a phase rotation value between the precoding matrix indicators for each of the measured channels.

12. A terminal configured to report a channel state of a downlink channel transmitted through a 2-dimension (2D) array antenna element including one or more row antenna arrays and one or more column antenna arrays, the terminal comprising:
a radio frequency (RF) unit; and
a processor configured to control the RF unit,
wherein the processor is further configured to:
receive configurations for a channel state information (CSI) process 1 and a CSI process 2,
wherein each of the CSI process 1 and the CSI process 2 includes a plurality of CSI-reference signal (RS) configurations,
select one of the CSI process 1 and the CSI process 2 when a CSI feedback period and a CSI feedback offset of the CSI process 1 are equal to those of the CSI process 2, and
measure and report the downlink channel to a serving base station according to the selected one of the CSI process 1 and the CSI process 2.

* * * * *